US012586387B2

(12) United States Patent (10) Patent No.: US 12,586,387 B2
Atmeh et al. (45) Date of Patent: Mar. 24, 2026

(54) OBJECT TRACKING FOR VEHICLE

(71) Applicant: Ford Global Technologies, LLC, Dearborn, MI (US)

(72) Inventors: Ghassan Atmeh, Detroit, MI (US); Michael Schoenberg, Seattle, WA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/743,310

(22) Filed: Jun. 14, 2024

(65) Prior Publication Data

US 2025/0384696 A1 Dec. 18, 2025

(51) Int. Cl.
*G06V 20/58* (2022.01)
*G06T 7/277* (2017.01)

(52) U.S. Cl.
CPC .............. *G06V 20/58* (2022.01); *G06T 7/277* (2017.01)

(58) Field of Classification Search
CPC ................................ G06V 20/58; G06T 7/277
See application file for complete search history.

(56) References Cited

U.S. PATENT DOCUMENTS

| | | |
|---|---|---|
| 7,965,867 B2 | 6/2011 | Lanz |
| 8,954,262 B2 | 2/2015 | Adam et al. |
| 2021/0056713 A1 | 2/2021 | Rangesh et al. |

| | | | |
|---|---|---|---|
| 2023/0251951 A1* | 8/2023 | Bosse | ............... B60W 60/0027 701/104 |
| 2023/0326215 A1 | 10/2023 | Yu et al. | |
| 2024/0362798 A1* | 10/2024 | Driscoll | ................. G06V 20/10 |

FOREIGN PATENT DOCUMENTS

CN 104376577 A 2/2015

OTHER PUBLICATIONS

Urdiales et al., "An Improved Deep Learning Architecture for Multi-Object Tracking Systems", https://doi.org/10.3233/ica-230702, Integrated Computer-Aided Engineering, 30(2), pp. 121-134.

(Continued)

*Primary Examiner* — James M Pontius
(74) *Attorney, Agent, or Firm* — Frank A. MacKenzie; Brooks Kushman P.C.

(57) ABSTRACT

A computer includes a processor and a memory, and the memory stores instructions executable by the processor to associate detected objects from sensor data with tracked objects in a tracking list stored in the memory by executing an association model, determine kinematic states of the tracked objects by executing a Bayesian filter, and update which of the tracked objects are stored in the tracking list by executing a track-management model. The association model includes association weights and outputs probabilities that the detected objects are the same as the tracked objects. An association-model gradient of the association model is computable. The association-model gradient is of the probabilities with respect to the association weights. The Bayesian filter includes Bayesian parameters. A Bayesian-filter gradient of the Bayesian filter is computable. The Bayesian-filter gradient is of the kinematic states with respect to the Bayesian parameters. A track-management gradient of the track-management model is computable.

19 Claims, 3 Drawing Sheets

(56) References Cited

OTHER PUBLICATIONS

Xiang et al., "Online Multi-Object Tracking Based on Feature Representation and Bayesian Filtering Within a Deep Learning Architecture", Received Feb. 16, 2019, accepted Feb. 19, 2019, date of publication Feb. 25, 2019, date of current version Mar. 13, 2019. Digital Object Identifier 10.1109/ACCESS.2019.2901520, vol. 7, 2019, © 2019 IEEE.

* cited by examiner

OBJECT TRACKING FOR VEHICLE

BACKGROUND

Advanced driver assistance systems (ADAS) are electronic technologies that assist drivers in driving and parking functions. Examples of ADAS include forward proximity detection, lane-departure detection, blind-spot detection, braking actuation, adaptive cruise control, and lane-keeping assistance systems. Some types of ADAS actuate components of the vehicle based on objects in the environment around the vehicle.

DETAILED DESCRIPTION

Figure 1:
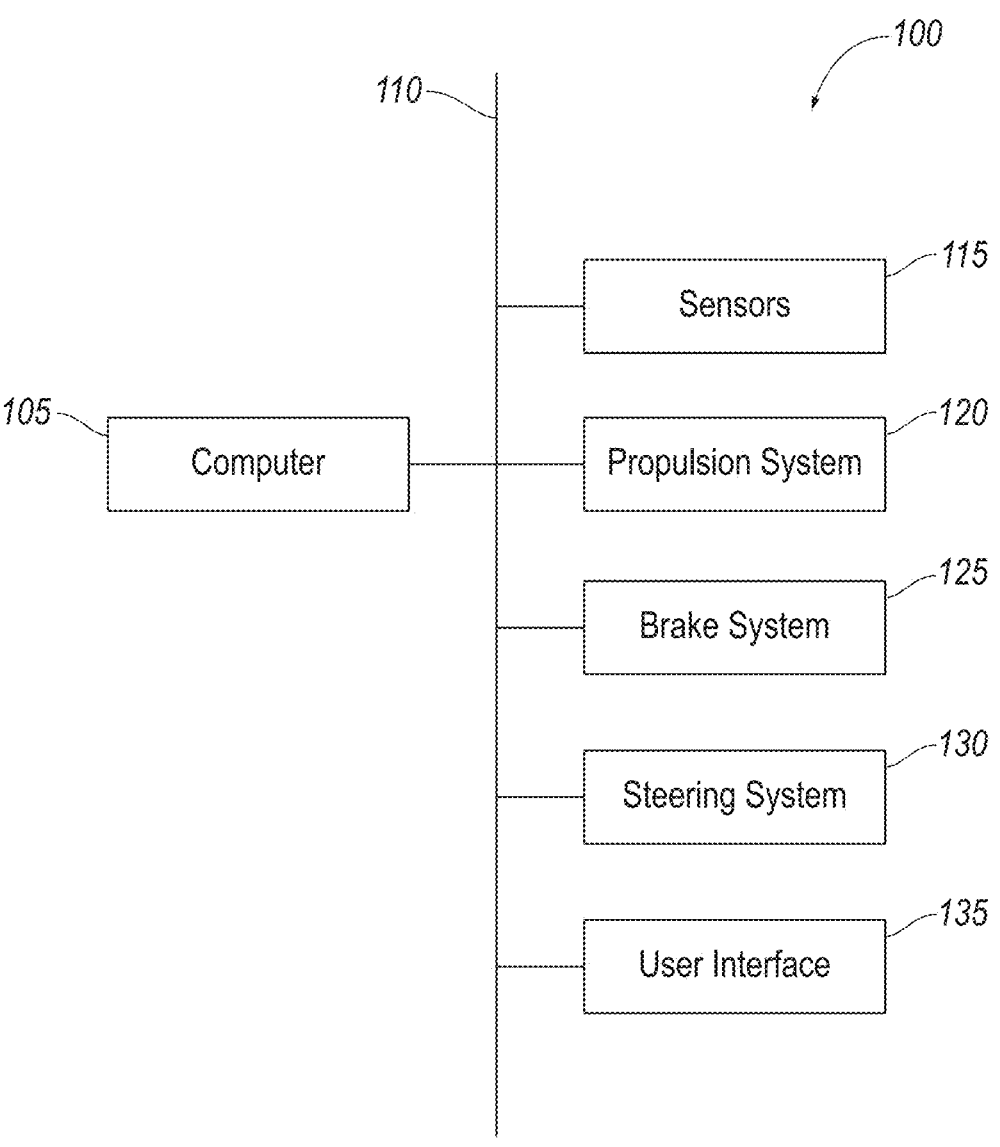
FIG. 1 is a block diagram of an example vehicle.

This disclosure describes techniques for tracking objects near a vehicle as the objects and/or the vehicle move around an environment. A computer on board the vehicle stores the objects being tracked in a tracking list. The computer executes an object-tracking architecture for tracking the objects. The object-tracking architecture includes an association model, a Bayesian filter, and a track-management model. The association model associates detected objects from sensor data with tracked objects in the tracking list. The Bayesian filter (e.g., an extended Kalman filter) determines kinematic states of the tracked objects. The track-management model updates which of the tracked objects are stored in the tracking list. The computer may operate a component of the vehicle based on the kinematic states of the tracked objects.

The association model, the Bayesian filter, and the track-management model are constructed such that gradients are computable for each of them. For example, the association model outputs probabilities that the detected objects are the same as the tracked objects, and the gradient is of the probabilities with respect to weights in the association model. The gradient for the Bayesian filter is of the kinematic states with respect to parameters in the Bayesian filter, e.g., measurement noise covariance or process noise covariance. The object-tracking architecture is thus differentiable from "end to end." This differentiability facilitates joint training of the components of the object-tracking architecture because the gradients can be used to optimize an objective function during the training process. The joint training can more efficiently construct the object-tracking architecture.

A computer includes a processor and a memory, and the memory stores instructions executable by the processor to associate detected objects from sensor data with tracked objects in a tracking list stored in the memory by executing an association model, determine kinematic states of the tracked objects by executing a Bayesian filter, and update which of the tracked objects are stored in the tracking list by executing a track-management model. The association model includes association weights and outputs probabilities that the detected objects are the same as the tracked objects. An association-model gradient of the association model is computable. The association-model gradient is of the probabilities with respect to the association weights. The Bayesian filter includes Bayesian parameters. A Bayesian-filter gradient of the Bayesian filter is computable. The Bayesian-filter gradient is of the kinematic states with respect to the Bayesian parameters. A track-management gradient of the track-management model is computable.

In an example, the instructions may further include instructions to operate a component of a vehicle based on the kinematic states of the tracked objects.

In an example, the association model may be a trained machine-learning model, and training the association model may include adjusting the association weights.

In an example, the Bayesian filter may include an update step and a prediction step, the prediction step outputting predicted kinematic states of the tracked objects for a current timestep based on the kinematic states of the tracked objects at a previous timestep, and the update step outputting updated kinematic states based on the predicted kinematic states and the detected objects.

In an example, the Bayesian parameters may include a noise parameter.

In an example, the track-management model may be a Markov decision process. In a further example, the Markov decision process may include a reward function defining utilities of transitioning between states and a policy function defining actions based on the states, and the track-management gradient may be of the reward function with respect to the policy function.

In an example, the track-management model may classify the tracked objects into one of a plurality of existences states, the existence states including an existing state and an expired state, the expired state indicating that the tracked object is no longer present.

In an example, the association model, the Bayesian filter, and the track-management model may be jointly trained. In a further example, jointly training the association model, the Bayesian filter, and the track-management model may include optimizing an objective function by using the association-model gradient, the Bayesian-filter gradient, and the track-management gradient.

In another further example, jointly training the association model, the Bayesian filter, and the track-management model may include adjusting the association weights of the association model.

In another further example, jointly training the association model, the Bayesian filter, and the track-management model may include adjusting the Bayesian parameters of the Bayesian filter.

In another further example, the track-management model may be a Markov decision process, and jointly training the association model, the Bayesian filter, and the track-management model may include adjusting a policy function of the Markov decision process.

A method includes associating detected objects from sensor data with tracked objects in a tracking list stored in a memory by executing an association model, determining kinematic states of the tracked objects by executing a Bayesian filter, and updating which of the tracked objects are stored in the tracking list by executing a track-management model. The association model includes association weights and outputs probabilities that the detected objects are the same as the tracked objects. An association-model gradient of the association model is computable. The association-model gradient is of the probabilities with respect to the association weights. The Bayesian filter includes Bayesian parameters. A Bayesian-filter gradient of the Bayesian filter is computable. The Bayesian-filter gradient is of the kinematic states with respect to the Bayesian parameters. A track-management gradient of the track-management model is computable.

In an example, the method may further include operating a component of a vehicle based on the kinematic states of the tracked objects In an example, the association model, the Bayesian filter, and the track-management model may be jointly trained. In a further example, jointly training the association model, the Bayesian filter, and the track-management model may include optimizing an objective function by using the association-model gradient, the Bayesian-filter gradient, and the track-management gradient.

In another further example, jointly training the association model, the Bayesian filter, and the track-management model may include adjusting the association weights of the association model.

In another further example, jointly training the association model, the Bayesian filter, and the track-management model may include adjusting the Bayesian parameters of the Bayesian filter.

In another further example, the track-management model may be a Markov decision process, and jointly training the association model, the Bayesian filter, and the track-management model may include adjusting a policy function of the Markov decision process.

With reference to the Figures, wherein like numerals indicate like parts throughout the several views, a computer 105 of a vehicle 100 includes a processor and a memory, and the memory stores instructions executable by the processor to associate detected objects from sensor data 220 with tracked objects in a tracking list 250 stored in the memory by executing an association model 205, determine kinematic states 245 of the tracked objects by executing a Bayesian filter 210, and update which of the tracked objects are stored in the tracking list 250 by executing a track-management model 215. The association model 205 includes association weights and outputs probabilities that the detected objects are the same as the tracked objects. An association-model gradient of the association model 205 is computable. The association-model gradient is of the probabilities with respect to the association weights. The Bayesian filter 210 includes Bayesian parameters. A Bayesian-filter gradient of the Bayesian filter 210 is computable. The Bayesian-filter gradient is of the kinematic states 245 with respect to the Bayesian parameters. A track-management gradient of the track-management model 215 is computable.

With reference to FIG. 1, the vehicle 100 may be any passenger or commercial automobile such as a car, a truck, a sport utility vehicle, a crossover, a van, a minivan, a taxi, a bus, etc. The vehicle 100 may include the computer 105, a communications network 110, sensors 115, a propulsion system 120, a brake system 125, a steering system 130, and a user interface 135.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 110. The communications network 110 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the sensors 115, the propulsion system 120, the brake system 125, the steering system 130, the user interface 135, and other components via the communications network 110.

The sensors 115 may provide data about operation of the vehicle 100, for example, wheel speed, wheel orientation, and engine and transmission data (e.g., temperature, fuel consumption, etc.). The sensors 115 may detect the location and/or orientation of the vehicle 100. For example, the sensors 115 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 115 may detect the external world, e.g., objects and/or characteristics of surroundings of the vehicle 100, such as other vehicles, road lane markings, traffic lights and/or signs, road users, etc. For example, the sensors 115 may include radar sensors, ultrasonic sensors, scanning laser range finders, light detection and ranging (lidar) devices, and image processing sensors such as cameras.

The propulsion system 120 of the vehicle 100 generates energy and translates the energy into motion of the vehicle 100. The propulsion system 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 120 can include an electronic control unit (ECU) or the like that is in communication with and receives input from the computer 105 and/or a human operator. The human operator may control the propulsion system 120 via, e.g., an accelerator pedal and/or a gear-shift lever.

The brake system 125 is typically a conventional vehicle braking subsystem and resists the motion of the vehicle 100 to thereby slow and/or stop the vehicle 100. The brake system 125 may include friction brakes such as disc brakes, drum brakes, band brakes, etc.; regenerative brakes; any other suitable type of brakes; or a combination. The brake system 125 can include an electronic control unit (ECU) or the like that is in communication with and receives input from the computer 105 and/or a human operator. The human operator may control the brake system 125 via, e.g., a brake pedal.

The steering system 130 is typically a conventional vehicle steering subsystem and controls the turning of the wheels. The steering system 130 may be a rack-and-pinion system with electric power-assisted steering, a steer-by-wire system, as both are known, or any other suitable system. The steering system 130 can include an electronic control unit (ECU) or the like that is in communication with and receives input from the computer 105 and/or a human operator. The human operator may control the steering system 130 via, e.g., a steering wheel.

The user interface 135 presents information to and receives information from an operator of the vehicle 100. The user interface 135 may be located, e.g., on an instrument panel in a passenger compartment of the vehicle 100, or wherever may be readily seen by the operator. The user interface 135 may include dials, digital readouts, screens, speakers, and so on for providing information to the operator, e.g., human-machine interface (HMI) elements such as are known. The user interface 135 may include buttons, knobs, keypads, microphone, and so on for receiving information from the operator.

Figure 2:
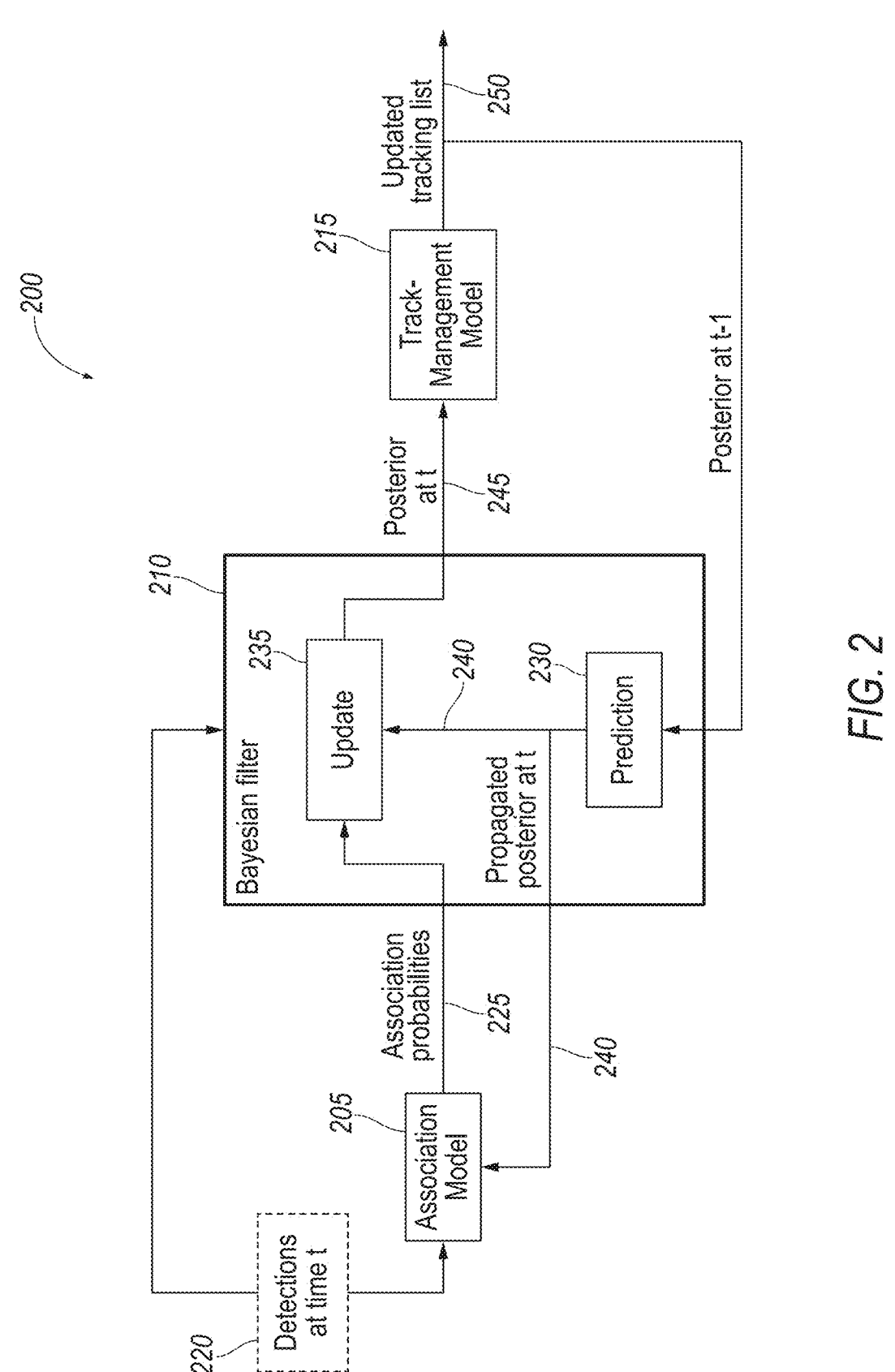
FIG. 2 is a block diagram of an example architecture for tracking objects around the vehicle.

With reference to FIG. 2, the computer 105 may detect the objects using sensor data 220 received from the sensors 115. The sensor data 220 may include image data from cameras; range data from radars, lidars, or ultrasonic sensors; etc. The image data are a sequence of image frames of the fields of view of the respective cameras. Each image frame is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The range data may be, e.g., a point cloud. The points of the point cloud specify respective positions in the environment relative to the position of the ranging sensor, e.g., the radar or lidar. For example, the range data can be in spherical coordinates with the ranging sensor at the origin of the spherical coordinate system. The spherical coordinates can include a radial distance, i.e., a measured depth from the ranging sensor to the point measured by the ranging sensor; a polar angle, i.e., an angle from a vertical axis through the ranging sensor to the point measured by the ranging sensor; and an azimuthal angle, i.e., an angle in a horizontal plane from a horizontal axis through the ranging sensor to the point measured by the ranging sensor.

The computer 105 may be programmed to detect the objects based on the sensor data 220. For example, for the image data, the computer 105 may identify the objects using conventional image-recognition techniques, e.g., a convolutional neural network programmed to accept images as input and output identified objects. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type for an object, and the final output is the type with the highest score. The computer 105 may use similar machine-learning techniques for the range data.

The computer 105 may perform sensor fusion of the image data and the range data. Sensor fusion is combining data from disparate sources together so that the resulting data has less uncertainty than if the data from each source were used individually, e.g., in creating a unified model of the environment of the vehicle 100. The sensor fusion can be performed with one or more algorithms, e.g., Kalman filter, central limit theorem, Bayesian networks, Dempster-Shafer, convolutional neural networks, etc. As a result of the sensor fusion, the range data at each timestep may be associated with the objects detected in the image data.

For the purposes of this disclosure, a "detected object" is defined as an object as indicated by sensor data received at a timestep, and a "tracked object" is defined as an object for which the computer 105 updates data over time. As will be described below, the computer 105 may determine that a detected object becomes a new tracked object, that a detected object is the same as an already tracked object, or that a detected object will not be tracked.

For the purposes of this disclosure, a "kinematic state" is defined as a mathematical description of the position and/or motion of an entity. The kinematic states 245 may include some combination of a position, a heading, a velocity vector, a scalar speed, and/or a yaw rate. For example, the kinematic states 245 may include position, heading, and scalar speed. The computer 105 may determine the kinematic states 245 of the objects based on data from the sensors 115, e.g., positions and velocities of the objects over time from radar, ultrasonics sensors, and/or lidar. The computer 105 may update the kinematic states 245 of the objects by executing the Bayesian filter 210, as described below.

The computer 105 stores a tracking list 250 in the memory of the computer 105. The tracking list 250 includes the tracked objects. The tracked objects in the tracking list 250 are the objects considered by the computer 105 when operating the vehicle 100, as described below. The tracking list 250 may track the kinematic states 245 of the tracked objects. The tracking list 250 at a given timestep may not necessarily correspond to the detected objects detected at that timestep. For example, not all detected objects may be included as tracked objects in the tracking list 250, and the tracking list 250 may include tracked objects that were detected at an earlier timestep but not the most recent timestep.

The computer 105 may be programmed to execute an object-tracking architecture 200. The object-tracking architecture 200 includes the association model 205, the Bayesian filter 210, and the track-management model 215. The association model 205 and the Bayesian filter 210 receive the sensor data 220. As will be described below, the association model 205 outputs association probabilities 225 to the Bayesian filter 210. The Bayesian filter 210 outputs predicted kinematic states 240 to the association model 205, and the Bayesian filter 210 outputs the kinematic states 245 to the track-management model 215. The track-management model 215 outputs an updated tracking list 250 to the Bayesian filter 210.

The computer 105 is programmed to associate the detected objects from the sensor data 220 with the tracked objects in the tracking list 250. For each detected object at a given timestep, the computer 105 may output a tracked object that is most likely the same as the detected object or an indication that the tracked object is likely not the same as any of the tracked objects. Thus, at each timestep, the computer 105 may output a mapping of the detected objects from that timestep to corresponding existing or new tracked objects.

The computer 105 associates the detected objects with the tracked objects by executing the association model 205. The association model 205 receives the detected objects and the tracking list 250 as inputs. For example, the association model 205 may receive the tracking list 250 implicitly as the predicted kinematic states 240 for the tracked objects on the tracking list 250. The predicted kinematic states 240 are used in order to be at the same timestep as the detected objects. The association model 205 outputs probabilities that the detected objects are the same as the tracked objects, e.g., that each detected object is the same as one of tracked objects, which will be referred to as association probabilities 225. The association model 205 may be a trained machine-learning model, trained as described below. For example, the association model 205 may be a classifier, e.g., a neural network classifier. The neural network classifier may be any suitable type of neural network, e.g., a feedforward neural network or a transformer network.

The association model 205 includes weights, which will be referred to as association weights. The association weights are parameters of the association model 205 that are adjusted as the association model 205 is trained. For example, for a neural network, the association weights are strengths of connections between neurons or groups of neurons in adjacent layers.

The computer 105 is programmed to determine the kinematic states 245 of the tracked objects, e.g., based on the sensor data 220 and on the previous kinematic states 245 of the tracked objects. The computer 105 determines the kinematic states 245 of the tracked objects by executing a Bayesian filter 210. The Bayesian filter 210 works by forming a feedback loop between a prediction step 230, i.e., predicting the kinematic states 240 and error estimates for a next time step using prediction equations, and an update step 235, i.e., adjusting the predictions with measurements from the sensors 115 using measurement equations. The Bayesian filter 210 may be a Kalman filter, e.g., an extended Kalman filter.

The prediction step 230 outputs the values for the kinematic states 245 of the tracked objects at a current timestep/ based on the values of the kinematic states 245 at a previous timestep t−1. The prediction step 230 may receive the tracking list 250 as updated by the track-management model 215, and the prediction step 230 thus operates on the tracked objects in the tracking list 250. The prediction step 230 may be based on a process model, e.g., a physics-based and/or machine-learning model of changes in the states of objects in the scene over time. For example, the process model may be a regression network. In the prediction step 230, the computer 105 may determine the predicted kinematic states 240 $\mu_t^-$, as an output of the process model based on the kinematic states 245 $\mu_{t-1}$ at the previous timestep. The computer 105 may determine the process noise matrix $Q_{t-1}$ at the previous timestep as an output of the process model based on the kinematic states 245 $\mu_{t-1}$ at the previous timestep. The process noise matrix $Q_t$ represents a noise resulting from attributes of the objects in the environment. The computer 105 may determine the predicted error covariance $P_t^-$ based on the predicted kinematic states 240 $\mu_t^-$, the process noise matrix $Q_{t-1}$, a state transition matrix $F_x$, and the error covariance $P_{t-1}$ at a previous timestep, e.g., as in the following expressions:

$$\mu_t^- = \mathfrak{M}(\mu_{t-1})$$

$$Q_{t-1} = \mathfrak{M}(\mu_{t-1})$$

$$P_t^- = F_x(\mu_{t-1})P_{t-1}F_x(\mu_{t-1})^T + Q_{t-1}$$

in which $\mathfrak{M}(\ )$ is the process model and the superscript T is the transpose operator. The state transition matrix $F_x$ may be the Jacobian of the process model.

The update step 235 outputs updated kinematic states 245 based on the predicted kinematic states 240, the detected objects in the sensor data 220, and the association probabilities 225. The detected objects are represented as a sensor output $z_t$. The computer 105 may use the association probabilities 225 to allocate the detected objects to entries in the sensor output $z_t$ corresponding to the tracked objects, e.g., not allocating a detected object to an entry if the corresponding association probability is low, weighting multiple detected objects by the corresponding association probability if the multiple detected objects are allocated to the same entry, etc. The computer 105 may determine a predicted sensor output $z_t^-$ based on the predicted kinematic states 240 $\mu_t^-$, e.g., according to a measurement model h, as in the following expression:

$$z_t^- = h(\mu_t^-)$$

The measurement model h represents a model for mapping between the output of the sensors 115 and the kinematic states 245. The computer 105 may determine a measurement noise matrix $R_t$ as an output of the measurement model based on the sensor output $z_t$, as in the following expression:

$$R_t = h(z_t)$$

The measurement noise matrix $R_t$ represents noise included in measurements by the sensors 115, which is a characteristic of the sensors 115. The computer 105 may determine a residual error covariance $P_{z,t}$, based on the predicted kinematic states 240 $\mu_t^-$, the predicted error covariance $P_t^-$, and the measurement noise matrix $R_t$, e.g., as in the following expression:

$$P_{z,t} = H_x(\mu_t^-)P_t^- H_x(\mu_t^-)^T + R_t$$

in which $H_x$ is the Jacobian of the measurement model h. The computer 105 may determine a gain factor $K_t$ based on the predicted error covariance $P_t^-$, the predicted kinematic states 240 $\mu_t^-$, and the residual error covariance $P_{z,t}$, as in the following expression:

$$K_t = P_t^- H_x(\mu_t^-)^T (P_{z,t})^{-1}$$

The computer 105 may determine the kinematic states 245 $\mu_t$, based on the predicted kinematic states 240 $\mu_t^-$, the gain factor $K_t$, the sensor output $z_t$, and the predicted sensor output $z_t^-$, as in the following expression:

$$\mu_t = \mu_t^- + K_t(z_t - z_t^-)$$

The computer 105 may determine the error covariance $P_t$ based on the predicted error covariance $P_t^-$, the gain factor $K_t$, and the residual error covariance. $P_{z,t}$, as in the following expression:

$$P_t = P_t^- - K_t P_{z,t} K_t^T$$

The Bayesian filter 210 includes parameters, which will be referred to as Bayesian parameters. The Bayesian parameters are values used for calculation in the Bayesian filter 210, other than the variables (e.g., the kinematic states 245 and error covariance, as well as the predicted kinematic states 240 and predicted error covariance), measured quantities (e.g., the sensor output and predicted sensor output), and intermediate steps (e.g., gain factor and residual error covariance). The Bayesian parameters include at least one noise parameter, e.g., the process noise matrix and the measurement noise matrix. Although the process noise matrix and the measurement noise matrix are typically hand-tuned, in the example of this disclosure, the computer 105 determines the process noise matrix and the measurement noise matrix according to the process model and the measurement model accordingly. The Bayesian parameters may also include the weights of the process model and of the measurement model. For example, for a network such as a regression network, the weights are strengths of connections between neurons or groups of neurons in adjacent layers.

The computer 105 is programmed to update which of the tracked objects are stored in the tracking list 250. For example, the computer 105 may add a new tracked object to the tracking list 250, remove an existing tracked object from the tracking list 250, or maintain an existing tracked object in the tracking list 250. The status of the tracked object with respect to the tracking list 250 may be represented by an existence state of the tracked object. For example, the existence state of a tracked object may be a new state, an existing state, or an expired state. The new state indicates that the computer 105 added the tracked object to the tracking list 250 at the most recent timestep. The existing state indicates that the tracked object has been on the tracking list 250 for at least one timestep. The expired state indicates that the computer 105 removed the tracked object from the tracking list 250, e.g., because the tracked object is no longer present in the environment.

The computer 105 updates which of the tracked objects are stored in the tracking list 250 by executing a track-management model 215. The track-management model 215 classifies the tracked objects into one of the existences states, e.g., into one of the new state, the existing state, or the expired state. The track-management model 215 updates the tracking list 250 based on the outputs of the Bayesian filter 210, e.g., the kinematic states 245 of the tracked objects in the tracking list 250 at the previous timestep. The track-management model 215 may be any suitable algorithm for classifying the tracked objects based on the outputs of the Bayesian filter 210 over time, e.g., a convolutional neural network or a Markov decision process.

For example, the track-management model 215 may be a Markov decision process. A Markov decision process (MDP) is a discrete-time stochastic control process for modeling decision making in situations where outcomes are partly random and partly under the control of a decision maker. At each timestep, the process is in some state s, and the decision maker may choose any action a that is available in state s. The process responds at the next timestep by randomly moving into a new state s', and giving the decision maker a corresponding reward $R_a(s, s')$. The probability that the process moves into the new state s' is given by a state transition function $P_a(s, s')$. The probability is based on the current state s and the action a but may be independent of previous states and actions. The reward function defines utilities of transitioning between states, e.g., $R_a(s, s')$ indicates the utility of transitioning from state s to state s' due to action a. A Markov decision process is defined by a set of states s, a set of actions a, the state transition function, and the reward function, from which a policy function $\pi$ is determined. The policy function $\pi$ is a mapping from the states to the actions, i.e., a choice of the action a for each state s.

For this disclosure, the states s of the Markov decision process are the existence states, e.g., $s_0$ is the new state, $s_1$ is the existing state, and $s_2$ is the expired state. For each state, the actions a are the choice of state into which to transition, e.g., from new state to existing state, or from existing state to either existing state or expired state. Moving to the expired state results in the termination of the Markov chain for that object, i.e., removal from the tracking list 250. The state transition function moves to the state intended by an action with probability 1. During the determination of the policy function (e.g., during the joint training as described below), the reward function indicates whether the object is present in the environment near the vehicle 100, with the existing state having a higher reward when the object continues to be present and the expired state having a higher reward when the object is no longer present. Once the policy function is determined, the policy function is stored in the memory of the computer 105. The policy function is based on the outputs of the Bayesian filter 210, e.g., the kinematic states 245 of the tracked objects in the tracking list 250 at the previous timestep.

The computer 105 may be programmed to operate the vehicle 100 based on the kinematic states 245 of the tracked objects. The computer 105 may actuate a component of the vehicle 100 based on the kinematic states 245 of the tracked objects. For example, the computer 105 may actuate one or more of the propulsion system 120, brake system 125, steering system 130, or user interface 135. For example, the computer 105 may actuate the component in executing an advanced driver assistance system (ADAS). ADAS are electronic technologies that assist drivers in driving and parking functions. Examples of ADAS include forward proximity detection, lane-departure detection, blind-spot detection, braking actuation, adaptive cruise control, and lane-keeping assistance systems. The computer 105 may actuate the brake system 125 to stop the vehicle 100 before reaching a current or future position of one of the tracked objects, according to an assistive braking algorithm. The computer 105 may actuate the user interface 135 to output a message to the operator notifying them of the current or future positions of the objects, e.g., according to a forward proximity detection algorithm. The computer 105 may operate the vehicle 100 autonomously, i.e., actuating the propulsion system 120, the brake system 125, and the steering system 130 based on current or future positions of the objects. The computer 105 may execute a path-planning algorithm to navigate the vehicle 100 around the objects.

The object-tracking architecture 200 may be trained before installation on the computer 105. The association model 205, the Bayesian filter 210, and the track-management model 215 may be jointly trained. For the purposes of this disclosure, "joint training" is defined as training multiple coupled-together machine-learning programs simultaneously such that the outputs of the programs are evaluated together. As a general overview, the joint training may include iterative execution of the association model 205, the Bayesian filter 210, and the track-management model 215. For each iteration, an objective function may be calculated, as described below. The objective function is used to update the association model 205, the Bayesian filter 210, and the track-management model 215, e.g., by adjusting parameters of the association model 205, the Bayesian filter 210, and the track-management model 215, as described below. For example, the joint training may include adjusting the association weights of the association model 205, the preset parameters of the Bayesian filter 210, and/or the policy function of the Markov decision process.

The joint training is based on training data. The training data may be streams of sensor data over time, paired with ground-truth annotations. The annotations may be labels of objects and ground-truth kinematic states of the objects. In each stream of sensor data, the labels may persist over time and may provide an identifier of an object as being the same object over time.

The objective function may be based on outputs by the association model 205, the Bayesian filter 210, and the track-management model 215, e.g., the association probabilities 225 of the association model 205, the kinematic states 245 of the Bayesian filter 210, and/or the reward function of the track-management model 215. For example, the objective function may be a sum of individual objective functions of the association model 205, the Bayesian filter 210, and the track-management model 215, e.g., as in the following expression:

$$J = J_{AM} + J_{Bayes} + J_{TM}$$

in which J is the objective function, $J_{AM}$ is the individual objective function for the association model 205, $J_{Bayes}$ is the individual objective function for the Bayesian filter 210, and $J_{TM}$ is the individual objective function for the track-management model 215. The individual objective function for the association model 205 may indicate an accuracy of the association probabilities 225 compared to the ground-truth annotations, e.g., if an association probability 225 indicates that a detected object is the same as a tracked object, whether the detected object and the tracked object have the same identifier in the annotations. The individual objective function for the Bayesian filter 210 may indicate an accuracy of the kinematic states 245, e.g., how close the kinematic states 245 are to the ground-truth states. The individual objective function for the track-management model 215 may be based on the reward function, e.g., a sum of the rewards over the time covered by the stream of sensor data, as in the following expression:

$$J_{TM} = E\left[\sum_t \gamma^t R_a(s_t, s_{t+1})\right]$$

in which E indicates an expected value, t is time, and y is a discount factor between 0 and 1.

Jointly training the association model 205, the Bayesian filter 210, and the track-management model 215 includes optimizing the objective function by using gradients of the association model 205, the Bayesian filter 210, and the track-management model 215. The term "gradient" is used in its mathematical sense as a vector-valued function giving a direction and rate of fastest increase of a function. The gradient of the association model 205 will be referred to as the association-model gradient, the gradient of the Bayesian filter 210 will be referred to as the Bayesian-filter gradient, and the gradient of the track-management model 215 will be referred to as the track-management gradient.

Each gradient may be of the individual objective function of the component with respect to the adjustable parameters of that component. The association-model gradient may be of the individual objective function $J_{AM}$, e.g., of the association probabilities 225, with respect to the association weights. The Bayesian-filter gradient may be of the individual objective function J Bayes, e.g., of the kinematic states 245, with respect to the preset parameters. The track-management gradient may be of the individual objective function $J_{TM}$, e.g., of the reward function, with respect to the policy function.

The joint training may be performed with a learning algorithm taking the gradients as inputs, e.g., gradient descent with backpropagation, supervised learning, etc. The association-model gradient, Bayesian-filter gradient, and track-management gradient are each computable, which makes the joint training possible. The gradient being computable means that the input function, i.e., the function from which the gradient is calculated, has the appropriate characteristics for calculating the gradient, namely that the input function is smooth and continuous with respect to the independent variables of the input function, thereby making the input function differentiable along its independent variables. For example, the track-management model 215 may be the Markov decision process as described, rather than being a set of heuristics for sorting detected objects into tracked objects. The input function for a set of heuristics would be a discrete set of outcomes rather than being smooth and continuous, meaning that the gradient would not be computable. The independent variables for the individual objective function $J_{AM}$ are the association weights; the independent variables for the individual objective function $J_{Bayes}$ are the preset parameters of the Bayesian filter 210; and the independent variables for the individual objective function $J_{TM}$ are parameters defining the policy function.

The object-tracking architecture 200 may lack components for which a gradient is not computable. The object-tracking architecture 200 does not have any intermediate components interposed between the association model 205, the Bayesian filter 210, or the track-management model 215 for which the gradient is not computable. The object-tracking architecture 200 may thus be differentiable from end to end, further facilitating the joint training.

The joint training is completed in response to a termination condition being satisfied, e.g., the objective function exceeding a threshold value and/or the joint training elapsing for a preset number of iterations. The threshold value or the preset number of iterations may be chosen to indicate or produce accurate operation by the object-tracking architecture 200. Once the termination condition is satisfied, the object-tracking architecture 200 may be considered trained and installed on the computer 105 of the vehicle 100.

Figure 3:
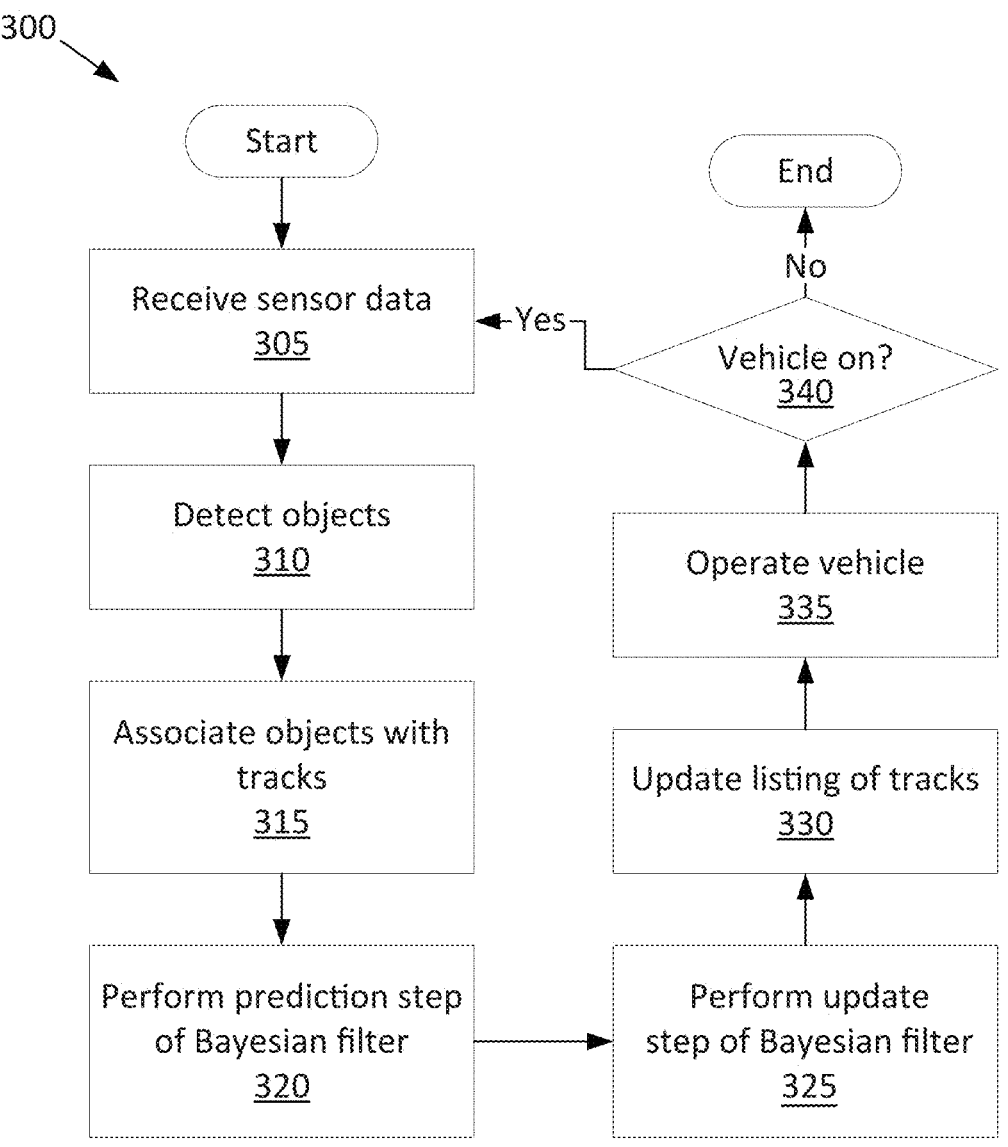
FIG. 3 is a flowchart of an example process for operating the vehicle based on tracking the objects.

FIG. 3 is a flowchart illustrating an example process 300 for executing the object-tracking architecture 200 to operate the vehicle 100. The memory of the computer 105 stores executable instructions for performing the steps of the process 300 and/or programming can be implemented in structures such as mentioned above. The process 300 begins when the vehicle 100 is turned on, i.e., started. As a general overview of the process 300, the computer 105 receives the sensor data 220, detects the objects in the sensor data 220, associates the detected objects with the tracked objects in the tracking list 250, performs the prediction step 230 of the Bayesian filter 210 to determine the predicted kinematic states 240 of the tracked objects, performs the update step

235 of the Bayesian filter 210 to determine the kinematic states 245 of the tracked objects, updates the tracking list 250, and operates a component of the vehicle 100 based on the kinematic states 245. The process 300 continues for as long as the vehicle 100 remains on.

The process 300 begins in a block 305, in which the computer 105 receives the sensor data 220 from the sensors 115, as described above.

Next, in a block 310, the computer 105 detects the objects in the sensor data 220 from the block 305, as described above.

Next, in a block 315, the computer 105 associates the detected objects from the block 310 with the tracked objects in the tracking list 250 by executing the association model 205, as described above.

Next, in a block 320, the computer 105 determines the predicted kinematic states 240 of the tracked objects by executing the prediction step 230 of the Bayesian filter 210 based on (from a most recent previous iteration) the kinematic states 245 of the tracked objects from a block 325 included in the tracking list 250 from a block 330, as described above. (The prediction step 230 may be skipped in the first iteration of the process 300 after the vehicle 100 starts.)

Next, in the block 325, the computer 105 determines the kinematic states 245 of the tracked objects by executing the update step 235 of the Bayesian filter 210 based on the predicted kinematic states 240 from the block 320, the associations from the block 315, and the detected objects in the sensor data 220 from the block 310, as described above.

Next, in the block 330, the computer 105 updates the tracking list 250 by executing the track-management model 215 based on the kinematic states 245 from the block 325, as described above.

Next, in a block 335, the computer 105 operates a component of the vehicle 100 based on the kinematic states 245 from the block 325, as described above.

Next, in a decision block 340, the computer 105 determines whether the vehicle 100 is still in an on state. For the purposes of this disclosure, "on state" is defined as the state of the vehicle 100 in which full electrical energy is provided to electrical components of the vehicle 100 and the vehicle 100 is ready to be driven, e.g., the engine is running; "off state" is defined as the state of the vehicle 100 in which a low amount of electrical energy is provided to selected electrical components of the vehicle 100, typically used when the vehicle 100 is being stored; and "accessory-power state" is defined as the state of the vehicle 100 in which full electrical energy is provided to more electrical components than in the off state and the vehicle 100 is not ready to be driven. Typically, an operator puts the vehicle 100 into the on state when the operator is going to operate the vehicle 100, puts the vehicle 100 into the off state when the operator is going to leave the vehicle 100, and puts the vehicle 100 into the accessory-power state when the operator is going to sit in but not operate the vehicle 100. In response to the vehicle 100 remaining in an on state, the process 300 returns to the block 305 to receive new sensor data 220 at a next timestep. In response to the vehicle 100 switching to the off state or accessory-power state, the process 300 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first," "second," "third," etc. are used throughout this document as identifiers and are not intended to signify importance, order, or quantity. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

associate detected objects from sensor data with tracked objects in a tracking list stored in the memory by executing an association model, the association model including association weights and outputting probabilities that the detected objects are the same as the tracked objects, an association-model gradient of the association model being computable, the association-model gradient being of the probabilities with respect to the association weights;

determine kinematic states of the tracked objects by executing a Bayesian filter, the Bayesian filter including Bayesian parameters, a Bayesian-filter gradient of the Bayesian filter being computable, the Bayesian-filter gradient being of the kinematic states with respect to the Bayesian parameters; and update which of the tracked objects are stored in the tracking list by executing a track-management model, a track-management gradient of the track-management model being computable;

wherein the association model, the Bayesian filter, and the track-management model are jointly trained.

2. The computer of claim 1, wherein the instructions further include instructions to operate a component of a vehicle based on the kinematic states of the tracked objects.

3. The computer of claim 1, wherein the association model is a trained machine-learning model, and training the association model includes adjusting the association weights.

4. The computer of claim 1, wherein the Bayesian filter includes an update step and a prediction step, the prediction step outputting predicted kinematic states of the tracked objects for a current timestep based on the kinematic states of the tracked objects at a previous timestep, and the update step outputting updated kinematic states based on the predicted kinematic states and the detected objects.

5. The computer of claim 1, wherein the Bayesian parameters include a noise parameter.

6. The computer of claim 1, wherein the track-management model is a Markov decision process.

7. The computer of claim 6, wherein the Markov decision process includes a reward function defining utilities of transitioning between states and a policy function defining actions based on the states, and the track-management gradient is of the reward function with respect to the policy function.

8. The computer of claim 1, wherein the track-management model classifies the tracked objects into one of a plurality of existences states, the existence states including an existing state and an expired state, the expired state indicating that the tracked object is no longer present.

9. The computer of claim 1, wherein jointly training the association model, the Bayesian filter, and the track-management model includes optimizing an objective function by using the association-model gradient, the Bayesian-filter gradient, and the track-management gradient.

10. The computer of claim 1, wherein jointly training the association model, the Bayesian filter, and the track-management model includes adjusting the association weights of the association model.

11. The computer of claim 1, wherein jointly training the association model, the Bayesian filter, and the track-management model includes adjusting the Bayesian parameters of the Bayesian filter.

12. The computer of claim 1, wherein the track-management model is a Markov decision process, and jointly training the association model, the Bayesian filter, and the track-management model includes adjusting a policy function of the Markov decision process.

13. A method comprising:

associating detected objects from sensor data with tracked objects in a tracking list stored in a memory by executing an association model, the association model including association weights and outputting probabilities that the detected objects are the same as the tracked objects, an association-model gradient of the association model being computable, the association-model gradient being of the probabilities with respect to the association weights;

determining kinematic states of the tracked objects by executing a Bayesian filter, the Bayesian filter including Bayesian parameters, a Bayesian-filter gradient of the Bayesian filter being computable, the Bayesian-filter gradient being of the kinematic states with respect to the Bayesian parameters; and updating which of the tracked objects are stored in the tracking list by executing a track-management model, a track-management gradient of the track-management model being computable;

wherein the association model, the Bayesian filter, and the track-management model are jointly trained.

14. The method of claim 13, further comprising operating a component of a vehicle based on the kinematic states of the tracked objects.

15. The method of claim 13, wherein jointly training the association model, the Bayesian filter, and the track-management model includes optimizing an objective function by using the association-model gradient, the Bayesian-filter gradient, and the track-management gradient.

16. The method of claim 13, wherein jointly training the association model, the Bayesian filter, and the track-management model includes adjusting the association weights of the association model.

17. The method of claim 13, wherein jointly training the association model, the Bayesian filter, and the track-management model includes adjusting the Bayesian parameters of the Bayesian filter.

18. The method of claim 13, wherein the track-management model is a Markov decision process, and jointly training the association model, the Bayesian filter, and the track-management model includes adjusting a policy function of the Markov decision process.

19. A computer comprising a processor and a memory, the memory storing instructions executable by the processor to:

associate detected objects from sensor data with tracked objects in a tracking list stored in the memory by executing an association model, the association model including association weights and outputting probabilities that the detected objects are the same as the tracked objects, an association-model gradient of the association model being computable, the association-model gradient being of the probabilities with respect to the association weights;

determine kinematic states of the tracked objects by executing a Bayesian filter, the Bayesian filter including Bayesian parameters, a Bayesian-filter gradient of the Bayesian filter being computable, the Bayesian-filter gradient being of the kinematic states with respect to the Bayesian parameters; and update which of the tracked objects are stored in the tracking list by executing a track-management model, a track-management gradient of the track-management model being computable;

wherein the track-management model is a Markov decision process;

the Markov decision process includes a reward function defining utilities of transitioning between states and a policy function defining actions based on the states; and the track-management gradient is of the reward function with respect to the policy function.

\* \* \* \* \*